US012793572B2

(12) United States Patent
Laurent et al.

(10) Patent No.: US 12,793,572 B2
(45) Date of Patent: Nov. 10, 2026

(54) METHOD FOR ASSISTING A USER OF A TERMINAL TO LEARN A PLURALITY OF ITEMS OF INFORMATION

(71) Applicant: Orange, Issy-les-Moulineaux (FR)

(72) Inventors: Sonia Laurent, Chatillon (FR); Cédric Floury, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 864 days.

(21) Appl. No.: 18/003,305

(22) PCT Filed: Jun. 17, 2021

(86) PCT No.: PCT/FR2021/051095
§ 371 (c)(1),
(2) Date: Dec. 23, 2022

(87) PCT Pub. No.: WO2021/260299
PCT Pub. Date: Dec. 30, 2021

(65) Prior Publication Data

US 2023/0245590 A1 Aug. 3, 2023

(30) Foreign Application Priority Data

Jun. 25, 2020 (FR) ...................................... 2006657

(51) Int. Cl.
*G09B 7/00* (2006.01)
*G09B 19/00* (2006.01)

(52) U.S. Cl.
CPC ........... *G09B 19/0053* (2013.01); *G09B 7/00* (2013.01)

(58) Field of Classification Search
CPC ........................................................ G09B 7/00
See application file for complete search history.

(56) References Cited

U.S. PATENT DOCUMENTS 5,727,951 A * 3/1998 Ho .......................... G09B 5/14 434/362
6,022,221 A * 2/2000 Boon ...................... G09B 7/04 434/323

(Continued)

OTHER PUBLICATIONS

Written Opinion of the International Searching Authority for International Application No. PCT/FR2021/051095, dated Oct. 2021.

(Continued)

*Primary Examiner* — Peter R Egloff
(74) *Attorney, Agent, or Firm* — Knobbe, Martens, Olson & Bear, LLP

(57) ABSTRACT

A method for assisting a user of a terminal to learn a plurality of items of information. The method includes when the user encounters a given item of information, from among the plurality of items of information, during a use of the terminal: storing, in a knowledge database, an item of contextual data relating to the encounter with an entry for the given item of information; determining a knowledge index for the given item of information, specific to the user, as a function of contextual data recorded in the knowledge database with the entry for the given item of information; and proposing access to at least one element for understanding the given item of information as a function of the determined knowledge index.

15 Claims, 2 Drawing Sheets

(56) References Cited

U.S. PATENT DOCUMENTS

| | | | | |
|---|---|---|---|---|
| 6,419,496 | B1 * | 7/2002 | Vaughan, Jr. | G09B 7/02<br>434/323 |
| 6,551,109 | B1 * | 4/2003 | Rudmik | G09B 7/02<br>434/335 |
| 6,652,283 | B1 * | 11/2003 | Van Schaack | G09B 7/04<br>434/323 |
| 9,348,815 | B1 | 5/2016 | Estes et al. | |
| 10,445,416 | B2 * | 10/2019 | Hailpern | G09B 5/02 |
| 2007/0202481 | A1 * | 8/2007 | Smith Lewis | G09B 19/06<br>434/323 |
| 2009/0157672 | A1 * | 6/2009 | Vemuri | G09B 19/00<br>707/999.005 |
| 2009/0325141 | A1 * | 12/2009 | Kelly | G09B 7/00<br>434/362 |
| 2010/0003659 | A1 | 1/2010 | Edmonds | |
| 2018/0012507 | A1 * | 1/2018 | Jeong | G09B 7/08 |
| 2020/0202736 | A1 * | 6/2020 | Adiatullin | A61B 5/378 |

OTHER PUBLICATIONS

Anonymous: "Anki Manual", Jun. 4, 2018, URL: https://web.archive.org/web/20180604052645/https://apps.ankiweb.net/docs/manual.

International Search Report for International Application No. PCT/FR2021/051095, dated Oct. 7, 2021.

* cited by examiner

METHOD FOR ASSISTING A USER OF A TERMINAL TO LEARN A PLURALITY OF ITEMS OF INFORMATION

CROSS-REFERENCE TO RELATED APPLICATIONS

This application is filed under 35 U.S.C. § 371 as the U.S. National Phase of Application No. PCT/FR2021/051095 entitled "METHOD FOR ASSISTING A USER OF A TERMINAL TO LEARN A PLURALITY OF ITEMS OF INFORMATION" and filed Jun. 17, 2021, and which claims priority to FR 2006657 filed Jun. 25, 2020, each of which is incorporated by reference in its entirety.

BACKGROUND

Field

The field of the development is that of assisting learning.

More precisely, the development relates to a method for assisting the learning of information by a user of a terminal.

"Information" means in particular, but not exclusively, names of technologies, concepts, places, people, etc., or any other item of information (also called "knowledge" or "skill") that can be useful to the user.

"Terminal" means in particular, but not exclusively, a personal computer (desktop or laptop), a tablet computer, a personal digital assistant, a smartphone, a workstation, etc., or any other device that a user can use to receive, send or search for content of the text and/or image and/or sound type.

"Content" means in particular, but not exclusively, an email, a message (instant or not), a document, a search (carried out for example with a web browser), a newsfeed of a social network, a content published on a social network, etc.

The development can be applied in numerous fields, for example:

- in the field of businesses, for employees (indeed, businesses wish to continually train employees and optimise their learning journey; learning is also at the heart of the concerns of employees, who wish to acquire new knowledge and grow professionally in a continuous manner);
- in the field of education, for pupils and students (at their workstation they can take advantage of the proposed solution to reduce search times and centralise the definitions found);
- in the field of personal development, for any user (for example, the proposed solution allows the user of a social network to be informed, in real time or with a delay, as soon as a new item of information (new concept or new element), never before encountered, appears in the newsfeed of their social network);
- etc.

Description of the Related Technology

At present, the learning of new knowledge (information, skills) for the employees handling a lot of information at their workstation (for example of the PC type) every day is not carried out in an assisted or proactive manner. When they notice a lack of information or of skills to move forward in an activity, it is up to the employee to do their own research on their workstation or ask for help or a specific training. They can thus lose time in this process of research and learning, or even not find the desired information. Moreover, overwhelmed by the profusion of this new information, they can also forget to search for its meaning.

A close or similar issue exists in numerous fields (field of education, field of personal development, etc.).

The goal of the development, in at least one embodiment, is in particular to overcome these various disadvantages of the prior art.

More precisely, in at least one embodiment of the development, one goal is to provide a technical solution for assisting the learning of information by the user of a terminal.

The goal of at least one embodiment of the development is also to provide such a solution that is simple to implement and easy to use.

Another goal of at least one embodiment of the development is to provide such a solution that allows to limit the computation resources of the computation machine, as well as the network traffic to and/or from the terminal of the user.

A complementary goal of at least one embodiment of the development is to provide such a solution that allows to adapt to both the user and to the information to be learned.

SUMMARY

In a specific embodiment of the development, a method is proposed, implemented by a computation machine, for assisting the learning of a plurality of items of information by a user of a terminal. The method comprises, during an encounter of the user with a given item of information, among the plurality of items of information, during a use of the terminal:

- storing in a knowledge base an item of context data relative to said encounter, with an entry for the given item of information;
- determining a knowledge index of the given item of information, specific to the user, according to context data recorded in the knowledge base with the entry for the given item of information; and
- proposing access to at least one element for understanding the given item of information as a function of the knowledge index determined.

Thus, the proposed solution proposes an approach that is indeed novel and inventive, consisting of a method for assisting learning that is implemented in a computation machine. It aims to identify the information that can be not known, or simply forgotten, by the employee (but which can be important, for example in the nature of their profession) by determining an index (or degree) of knowledge for each of these items of information. The proposed solution thus aims to propose to the user elements for understanding as a function of the knowledge index determined. Thus, if the knowledge index is judged to be too low (for example because it is lower than a threshold), elements for understanding are proposed to the user, whereas if the knowledge index is high, no element for understanding is proposed.

Thus, an advantage of the proposed solution is that it allows to limit the computation resources used by the computation machine, as well as the network traffic to and/or from the terminal of the user, since the number of notifications, to propose to the user to access the elements for understanding then to provide these elements for understanding (if the user desires it), is limited (the computation machine automatically selects the information for which it is necessary to propose elements for understanding).

The learning of the user is improved. Moreover, by adapting the elements for understanding as a function of the knowledge index, for example by reducing the size of the chosen element for understanding, this also allows to limit the network traffic. For example, for a value of the index indicating that the given item of information is not known to the user (for example the value 0 or a value close to 0), the element for understanding proposed is a complete initial training, whereas for a value of the index close to a threshold (for example 0.45 if the threshold is equal to 0.5) and indicating that the given item of information is possibly forgotten by the user, the element for understanding proposed is for example a shorter training (or a simple reminder of a definition).

One advantage of the proposed solution is that it is simple to implement since besides the terminal, which the user already has available, a computation machine (optionally the one already present in the terminal) cooperating with a knowledge base (database) suffices.

Another advantage of the proposed solution is that it is easy to use since the user is offered access to elements for understanding, for information that the computation machine itself selected automatically, as a function of the knowledge index determined.

Another advantage of the proposed solution is that it allows to adapt both to the user (since the knowledge index is a function of the content of the knowledge base, which itself depends on the choices of the user to access the proposed elements for understanding or not) and to the item of information to be learned (since the knowledge index is specific to a given item of information; in other words, each of the items of information is associated with its own knowledge index). Thus, the proposed solution allows to take into account the ease or on the contrary the difficulties that each user can encounter in specific areas of expertise (that is to say for specific items of information to be learned).

According to a specific feature, in the case of access, respectively non-access, by the user to said at least one element for understanding, the method comprises a storage, with said entry, of at least one item of context data relative to said access, respectively to said non-access.

Thus, the contents of the knowledge base are richer, which allows to further improve the computation of the knowledge index.

According to a specific feature, the encounter of the user with the given item of information belongs to the group comprising:

- presence of the given item of information in an email written or read by the user with the terminal;
- presence of the given item of information in a message, instant or not, written or read by the user with the terminal;
- presence of the given item of information in a document written or read by the user with the terminal;
- presence of the given item of information in a search carried out by the user with the terminal;
- presence of the given item of information in a newsfeed, of a social network, read by the user with the terminal;
- presence of the given item of information in a content published on a social network by the user with the terminal; and
- presence of the given item of information in a textual and/or visual and/or sound content, received, transmitted or searched for by the user with the terminal.

Thus, the proposed solution can take into account the large diversity in the encounters that the user can have with a given item of information. It is effective even if the user handles a large quantity of information. The list of types of encounters is not exhaustive.

According to a specific feature, said at least one element for understanding belongs to the group comprising:

- a definition of the given item of information;
- an explanation of the given item of information;
- a training on the given item of information;
- help relative to the given item of information; and
- an element for learning, written and/or oral and/or visual, the given item of information.

In this way, the proposed solution can provide a large diversity in the elements for understanding proposed to the user for their learning of a given item of information. The list of types of elements for understanding is not exhaustive.

According to a specific feature, said at least one item of information data belongs to the group comprising:

- a wording of the given item of information;
- a field to which the given item of information belongs;
- a nature of the given item of information; and
- a type of the given item of information.

The greater the number of items of information data managed (that is to say the more the item of information is specified), the more finely the knowledge index can be computed. “Type of the encounter of the user with the given item of information” means for example a choice between “reading”, “writing” and “search” (non-exhaustive list).

According to a specific feature, the context data belongs to the group comprising:

- a type of context indicating a type of the encounter of the user with the given item of information or indicating said proposition to access said at least one element for understanding;
- a date of the encounter of the user with the given item of information or of the access or of the non-access to said at least one element for understanding; and
- a number of sentences of a content in which the user encountered the given item of information.

Just like for the information data, the greater the number of items of context data managed (that is to say the more the item of information is specified), the more finely the knowledge index can be computed.

According to a specific feature, the determination of the knowledge index is a function:

- of a period of time since a last encounter of the user with the given item of information, said period of time being computed according to the information and context data stored, with the entry for the given item of information, in the knowledge base; and
- a forgetting curve.

In this way, the knowledge index can be computed easily during a certain number of first iterations of the method for assisting learning and as long as the knowledge base is not sufficiently filled for a computation of index based on a machine learning model (see detail below) to be considered as acceptable.

According to a specific feature, the determination of the knowledge index uses a machine learning model and comprises:

- generating an item of entry data, comprising a plurality of attributes themselves determined according to the information and context data stored, with the entry for the given item of information, in the knowledge base;
- providing said item of entry data to the machine learning model; and
- computation by the machine learning model of a result forming the knowledge index.

Via the use of a machine learning model (also called “machine learning”), the knowledge index can be computed with good performance and on the basis of several criteria (corresponding to the various items of information and context data).

According to a specific feature, the attributes comprised in the item of entry data belong to the group comprising:

- at least one information attribute, entered with said at least one item of information data; and
- at least one context attribute, entered with the context data and belonging to the group comprising:
  - a reference date, defined as the most recent date out of one or more date(s) of encounter of the given item of information and one or more date(s) of proposition of access to said at least one element for understanding;
  - a number of encounters of the given item of information in reading in a predetermined period preceding the reference date;
  - a number of encounters of the given item of information in writing in said predetermined period;
  - a number of searches for the given item of information, by the user, in said predetermined period;
  - an average number of sentences in contents in which the user has encountered the given item of information in reading in said predetermined period;
  - an average number of sentences in contents in which the user has encountered the given item of information in writing in said predetermined period; and
  - a number of accesses to said at least one element for understanding, in said predetermined period.

The greater the number of attributes managed in the item of entry data, the more finely the knowledge index can be computed. This list of attributes is not exhaustive.

According to a specific feature, the method comprises a building of the machine learning model, by carrying out a determined number of building iterations, each corresponding to an iteration of the method for assisting learning, and each comprising the following steps:

- generating said item of entry data, comprising said plurality of attributes themselves determined according to the information and context data stored, with the entry for the given item of information, in the knowledge base;
- determining an estimation of the knowledge index, according to the access or the non-access by the user to said at least one element for understanding;
- providing to the machine learning model said item of entry data and a known result, defined as said estimation of the knowledge index.

Thus, the machine learning model can be built via the information and context data stored during certain iterations of the method, while taking into account in particular the access or not by the user to the elements for understanding.

According to a specific feature, the estimation of the knowledge index is equal to:

- a first value indicating that the given item of information is not known by the user, in the case of access by the user to said at least one element for understanding; and
- a second value indicating that the given item of information is known to the user, in the case of non-access by the user to said at least one element for understanding.

For example, the first value is “0” and the second is “1”.

According to a specific feature, the building of the machine learning model is carried out again after a predetermined number of iterations of the method for assisting learning and/or at a predetermined frequency.

In this way, the machine learning model can change over time, to improve the learning as the number of iterations of the methods increases, that is to say as the contents of the knowledge base increase.

In another embodiment of the development, a computer program product is proposed comprising program code instructions which, when they are executed by a computation machine, cause the computation machine to carry out the aforementioned method (in any one of its various embodiments).

In another embodiment of the development, a storage medium readable by a computer and non-transient, storing the aforementioned computer program product, is proposed.

In another embodiment of the development, a computation machine configured to carry out the aforementioned method (in any one of its various embodiments) is proposed.

BRIEF DESCRIPTION OF THE DRAWINGS

Other features and advantages of the development will appear upon reading the following description, given as an informational and non-limiting example, and the appended drawings, in which.

DETAILED DESCRIPTION OF CERTAIN ILLUSTRATIVE EMBODIMENTS

In all the drawings of the present document, the identical elements and steps are designated by the same numerical reference.

Figure 1:
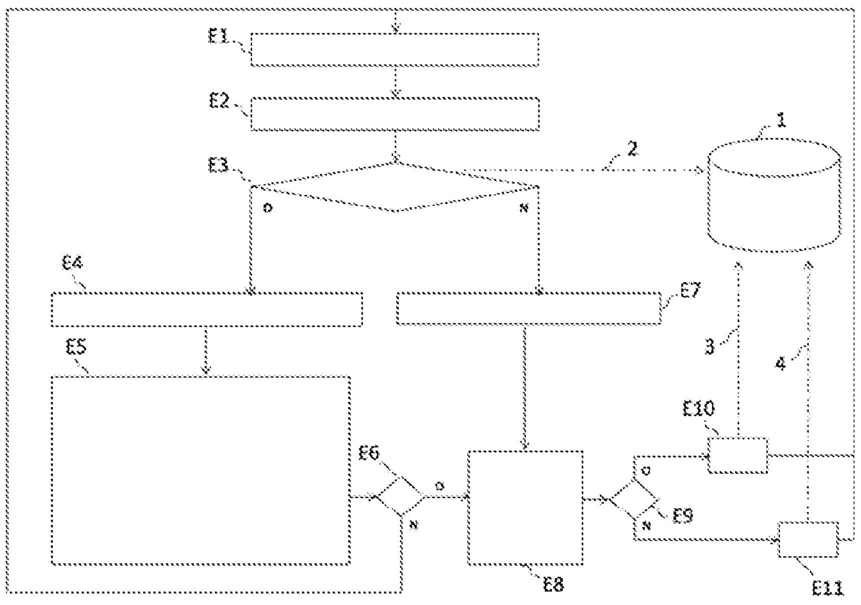
FIG. 1 presents a simplified flow chart of the method according to the development.

Now, in relation to the flow chart of FIG. 1, a specific embodiment of the method according to the development for assisting the learning of information by a user of a terminal will be presented.

The method is implemented by a computation machine (also called “system” in the rest of the description), for which an example of structure is presented below, in relation to FIG. 4. In a first implementation, the computation machine implementing the method is integrated into, or the same as, the terminal of the user (which is for example a desktop or laptop personal computer, a tablet computer, a personal digital assistant, a smartphone, a workstation, etc.). In a second implementation, the computation machine implementing the method is integrated into, or the same as, another device which cooperates with the terminal of the user (for example such as a domestic gateway, also called “Internet box”).

In a step E1, the computation machine examines, via one or more probes, the activity of the user on the terminal, comprising for example the content of the text and/or image and/or sound type that the user has received, sent or searched for. As already mentioned above, “content” means in particular, but not exclusively, an email, a message (instant or not), a document, a search (carried out for example with a web browser), a newsfeed of a social network, a content published on a social network, etc. In this step E1, it is supposed that the rights to access the data of the professional activities of the user locally are authorised in compliance with the General Data Protection Regulation (GDPR).

In a step E2, the computation machine analyses the contents examined and attempts to extract therefrom information that must be the object of learning by the user. The extraction is based for example on referential linguistic expression (named entities) and simple and extended phrases. As already mentioned above, this information (also called "key elements") is for example names of technologies, concepts, places, people, etc., or any other item of information (also called "knowledge" or "skill") that can be useful to the user.

In other words, the computation machine detects an encounter of the user with one or more items of information (key elements), during a use of the terminal. "Encounter of the user with a given item of information" means for example the presence of the given item of information in:

- an email written or read by the user with the terminal;
- a message, instant or not, written or read by the user with the terminal;
- a document written or read by the user with the terminal;
- a search carried out by the user with the terminal;
- a newsfeed, of a social network, read by the user with the terminal;
- a content published on a social network by the user with the terminal;
- a textual and/or visual and/or sound content, received, transmitted or searched for by the user with the terminal (for example such as the reading of a home page of an internal web site (Intranet));
- etc.

In a test step E3, for a given item of information extracted in step E2 (that is to say for an encounter of the user with this given item of information), the computation machine determines whether there is already an entry for the given item of information in a knowledge base 1 (database) aggregating information (key elements) for the user. For this, the computation machine queries the knowledge base 1, as symbolised by the arrow labelled 2.

If no entry for the given item of information exists in the knowledge base (negative response to the test of step E3), the algorithm continues to step E7 in which the computation machine creates in the knowledge base 1 an entry for the given item of information, and stores with this entry at least one item of information data relative to the given item of information and at least one item of context data relative to the encounter.

In step E7, the computation machine stores for example:

- the following information data:
  - wording of the given item of information;
  - field to which the given item of information belongs;
  - nature of the given item of information;
  - type of the given item of information; and
- the following context data:
  - type of context, indicating either the type of the encounter of the user with the given item of information (for example, "reading", "writing" or "search") or that it is a proposition of the computation machine to access the element for understanding;
  - date of the encounter of the user with the given item of information or of the access or of the non-access to the element for understanding;
  - number of sentences of the content in which the user encountered the given item of information.

Step E7 is followed by a step E8 in which the computation machine proposes to the user to access (at least) one element for understanding the given item of information. In a specific implementation, the element for understanding is chosen according to a value of the knowledge index. "Element for understanding" means for example: a definition of the given item of information, an explanation of the given item of information, a training on the given item of information, help relative to the given item of information, an element for learning (written and/or oral and/or visual) the given item of information, etc.

In a specific implementation, the element for understanding is structured in such a way that it includes a basic item of information that is completed or enriched according to a defined tree structure, the elements of this tree structure being selectable according to the value of the knowledge index.

In another possible implementation, the element for understanding can be structured by different information on size or quantity of data, in a data matrix for example. This matrix is built while taking into account for example characteristics of duration of reading of this element for understanding or of complexity.

Thus, according to the value of the knowledge index, an element for understanding having a longer or shorter duration of reading or a greater or lesser complexity can be selected in this matrix.

Thus the lower the knowledge index, the more the element for understanding must be complete, and thus have a greater reading time and/or a larger size and vice versa when the knowledge index is high.

If an entry for the given item of information already exists in the knowledge base (positive response to the test of step E3), the algorithm continues to step E4 in which the computation machine stores in the knowledge base, with the existing entry, at least one (other) item of context data relative to the encounter.

Then, in a step E5, the computation machine computes an index of knowledge (by the user) of the given item of information, according to the contents of the knowledge base.

For the computation of the knowledge index, one and/or the other of two methods is for example used, according to the number of iterations of the method already carried out before the current iteration. For example, for the N first iterations (in a specific implementation, N=1000), a first method based on a forgetting curve is used, and for the following iterations, a second method based on a machine learning model is used.

Figure 2:
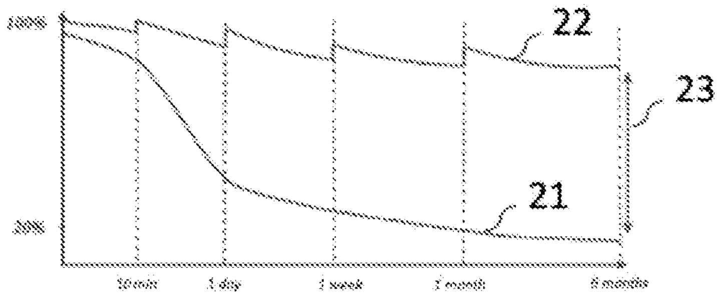
FIG. 2 is an example of a forgetting curve used in certain iterations of step E5 of FIG. 1.

The first method comprises for example a computation of the knowledge index according:

- to a period of time since a last encounter of the user with the given item of information; this period of time is computed by the computation machine according to the information and context data stored, with the entry for the given item of information, in the knowledge base 1; and
- a forgetting curve, for example such as the Ebbinghaus curve 21 illustrated in FIG. 2, with the time on the abscissa and the percentage of retention on the ordinate; the curve labelled 22 corresponds to the case in which the user is reminded of the item of information at the various times mentioned on the abscissa (10 min, 1 day, 1 week, 1 month and 6 months); the double arrow labelled 23 illustrates the gain obtained after six months (that is to say the difference between the two aforementioned curves 21 and 22).

The second method comprises for example the following steps to compute the knowledge index:

generating an item of entry data, comprising a plurality of attributes themselves determined according to the information and context data stored, with the entry for the given item of information, in the knowledge base;

providing the item of entry data to the machine learning model; and computation by the machine learning model of a result forming the knowledge index (the building of this model is discussed in detail below, in relation to FIG. 3).

In a specific implementation, the item of entry data comprises the following attributes:

- attributes corresponding directly to the information data (in the example given above: wording, field, nature and type of the given item of information) and thus inputted by the values of the latter; and
- context attributes computed (inputted) with the context data, for example like the following attributes:
  - reference date, defined as the most recent date out of the dates stored in the knowledge base for the given item of information (date(s) of the encounter of the user with the given item of information and date(s) of the access or of the non-access to the element for understanding);
  - number of encounters of the given item of information in reading in a predetermined period preceding the reference date;
  - number of encounters of the given item of information in writing in the aforementioned period;
  - number of searches for the given item of information, by the user, in the aforementioned period;
  - average number of sentences in contents in which the user has encountered the given item of information in reading in the aforementioned period;
  - average number of sentences in contents in which the user has encountered the given item of information in writing in said predetermined period;
  - number of accesses to the element for understanding, in the aforementioned period;
  - etc.

Step E5 is followed by a test step E6, in which the computation machine compares the knowledge index to a predetermined threshold. If the knowledge index is greater than or equal to the threshold, the algorithm goes back to step E1, for a new iteration of the method. If the knowledge index is lower than the threshold, the algorithm continues to step E8 already explained above (proposition of access to at least one element for understanding).

Step E8 is followed by a test step E9, in which the computation machine determines whether the user accessed the element for understanding.

In the case of access, the algorithm continues to step E10 in which the computation machine stores in the knowledge base (as symbolised by the arrow labelled 3), with the existing entry, at least one other item of context data, relative to the access. After step E10, the algorithm goes back to step E1, for a new iteration of the method.

In the case of non-access, the algorithm continues to step E11 in which the computation machine stores in the knowledge base (as symbolised by the arrow labelled 4), with the existing entry, at least one other item of context data, relative to the non-access. After step E11, the algorithm goes back to step E1, for a new iteration of the method.

Figure 3:
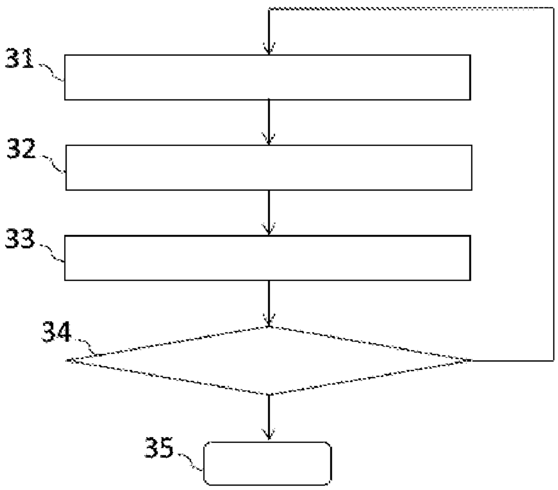
FIG. 3 presents a simplified flow chart of the building of the machine learning model used in certain iterations of step E5 of FIG. 1.

FIG. 3 presents a simplified flow chart of the building of the machine learning model, this model being used in certain iterations of step E5 of FIG. 1, as discussed above.

The building of the model comprises a determined number M of building iterations, each corresponding to one of the iterations of the method for assisting learning of FIG. 1.

In a specific implementation, the M building iterations correspond to the N first iterations of the method of FIG. 1 (for example N=M=1000). This means that during the building of the model, the computation of the knowledge index, in step E5 of FIG. 1, is carried out by using the first aforementioned method (based on a forgetting curve).

In a step 31, the computation machine generates an item of entry data as defined above (see step E5 of FIG. 1), that is to say comprising the plurality of attributes (themselves determined according to the information and context data stored, with the entry for the given item of information, in the knowledge base).

In a step 32, the computation machine determines an estimation of the knowledge index, according to the access or the non-access by the user to the element for understanding (see test step E9 of FIG. 1). In a specific implementation, the estimation is equal to a first value (for example "0") indicating that the given item of information is not known to the user, in the case of access by the user to the element for understanding (positive response in the test step E9), and to a second value (for example "1") indicating that the given item of information is known to the user, in the case of non-access by the user to the element for understanding (negative response in the test step E9).

In a step 33, the computation machine provides to the machine learning model the item of entry data, accompanied by the known result (defined as the estimation of the knowledge index, computed in step 32).

In a test step 34, the computation machine determines whether the number M of building iterations has been carried out. If no, the algorithm goes back to step 31, for a new building iteration. If yes, the algorithm continues to the end step 35.

The building method of FIG. 3 can be carried out again after a predetermined number of iterations of the method of FIG. 1 (for example after the iterations M+1 to 2M of FIG. 1, then after the iterations 2M+1 to 3M of FIG. 1, and so on). The building method of FIG. 3 can also be carried out again at a predetermined frequency (for example once per week).

Figure 4:
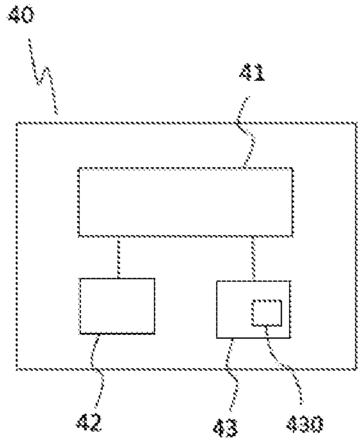
FIG. 4 presents the structure of a computation machine, according to a specific embodiment, configured to carry out the method of FIG. 1.

FIG. 4 presents an example of a structure of a computation machine 40 for carrying out (executing) the method of FIG. 1.

This structure comprises a random-access memory 42 (for example a RAM memory), a read-only memory 43 (for example a ROM memory or a hard disk) and a processing unit 41 (equipped for example with a processor, and controlled by a computer program 430 stored in the read-only memory 43). Upon initialisation, the code instructions of the computer program 430 are for example loaded into the random-access memory 42 before being executed by the processor of the processing unit 41.

This FIG. 4 illustrates only a specific manner, among other possible ones, of implementing a computation machine to carry out (execute) the method. Indeed, the computation machine is implemented indifferently in the form of a reprogrammable computation machine (a PC computer, a DSP processor or a microcontroller) executing a program comprising a sequence of instructions, or in the form of a dedicated computation machine (for example a set of logic gates such as an FPGA or an ASIC, or any other hardware module).

In the case of an implementation in the form of a reprogrammable computation machine, the corresponding program (that is to say the sequence of instructions) can be stored in a storage medium removable (for example such as a diskette, a CD-ROM or a DVD-ROM) or not, this storage medium being partly or totally readable by a computer or a processor.

Application Example: Case of Assisting the Learning of an Employee

The present application example attempts to resolve the following issue: how to identify/detect an item of information not known to or poorly known (capable of being forgotten) by the employee with regard to several criteria (for example, the period of time between a determined number of appearances (encounters) of this same item of information in their activities, the nature or the field associated with said item of information . . . ).

For example, an employee of a business can receive an electronic message (email) likely to contain: "For this, you must make an RCE". If the acronym RCE (meaning "Request for Computer Equipment") is not an item of information known to the employee, they are very likely to not be capable of carrying out the desired action. The method for assisting learning (see FIG. 1) will detect that the acronym RCE is not an item of information known to the employee in question, and will be able to provide them with one or more elements for understanding (in the present case access to the tool allowing to formulate a request for computer equipment).

Building of the Knowledge Base

The method aggregates in a database information forming the object of the learning (key elements) such as: names of technologies, concepts, places, people, or any other item of information that the employee encounters in their daily activities (emails, conversations on a messaging service (instant or not), documents . . . written or read) during a period more or less long and configurable according to their preferences or their profession.

The dates of encounter of the item of information by the employee are also listed in this knowledge base. And the nature of the encounter context in particular: is it in incoming emails? Is it a manual search for the item of information by the employee? Has the definition (forming an element for understanding) of this item of information proposed by the system (also called "computation machine" above) been read?

This context data is used to compute the index of knowledge of this item of information by the employee.

Detection of a New or Possibly Forgotten Item of Information

By analysing the entries of the employee as they arise such as the elements (contents) that they receive: emails, conversations, new read documents, the system detects the information contained in these entries and verifies the presence of this information in the knowledge base of the employee. If an item of information detected in one of the contents is not present in the knowledge base: the system considers that this item of information is potentially new, and thus not known to the employee.

If the item of information is already present in the knowledge base, the system computes a knowledge index. This index is based on several criteria, for example: the period of time between two appearances of the item of information (which can suggest forgetting if this period of time is long), the field associated with this item of information (network, project management, new technologies, etc.), the nature of the item of information (tools of the IS, contact, organisation, etc.), the context of appearance of the item of information, etc. The index is computed on the observation of the knowledge base of the employee and, in a specific embodiment, on the observation by the system of requests by the employee for additional information (or on the contrary the absence of requests for additional information) for information of a similar field or nature. The knowledge index is thus specific to the item of information and specific to the user.

When the method is started, the knowledge base can be initialised by information to which the employee has given access over a given period. Then the index will be based on average memorisation hypotheses, such as those that are visible on the Ebbinghaus Curve.

Principles of Building of the Knowledge Base of the Employee

A) Let us consider the item of information (acronym) "APN" that the employee reads in an email (step E1). It is not present (step E3) in the knowledge base that contains information corresponding for example to a month (initialisation on the basis of information coming from the history of the emails, instant or other messages).

The system thus stores (step E7) the following data (non-exhaustive list) in the knowledge base:

Wording: APN
Field: mobile network
Nature: Technology
Type: acronym
Context of appearance:
  Context identifier: C1
  Reading of the element
  In an email
  20 sentences long
  Date of appearance: XXXX.

The system displays (E8) a proposition of access to the definition of this acronym (item of information) to the user.

If the user clicks on the definition (that is to say accesses the element for understanding), the system considers that the definition was useful to them and adds (E10) into the knowledge base the following new context data (in particular an item of context data indicating "Item of information not known"), which will allow to produce a specific learning model associated with the employee:

Wording: APN
Field: mobile network
Nature: Technology
Type: acronym
Context of appearance:
  Context identifier: C2
  Definition proposed by the system
  Date of appearance: XXXX
  Item of information not known (since definition read by the employee).

If the user does not click on the definition (that is to say does not access the element for understanding), the system extrapolates and considers that the user knows this item of information. It adds (E11) into the knowledge base the following new context data (in particular an item of context data indicating "Information known"), which will allow to produce the specific learning model associated with the employee:

Wording: APN
Field: mobile network
Nature: Technology
Type: acronym
Context of appearance:
  Context identifier: C2'
  Definition proposed by the system Date of appearance: XXXX Item of information known (since definition not read by the employee).

B) It is supposed that one month later, the user reads the acronym (item of information) "APN" in an instant message (IM). The system detects (E3) that the item of information exists in the knowledge base and adds (E4) into the knowledge base the following new context data:

Wording: APN
Field: mobile network
Nature: Technology
Type: acronym
Context of appearance:
Context identifier: C3
Reading of the element
In an IM
1 phrase long
Date of appearance: XXXX At this stage, the knowledge base contains too little information and data to extrapolate and compute the index on the knowledge that the system has of the employee. It thus computes (E5) the knowledge index on the basis of the Ebbinghaus curve.

The item of information (acronym "APN") has not been seen for a month: during the display of the definition of the item of information. The system considers that, in these conditions (period of time of one month), 20% of the item of information has been retained: the index is thus assigned at 0.2. The system once again displays the definition (E8).

If the user clicks on the definition (that is to say accesses the element for understanding), the system considers that the definition was useful to them and adds (E10) into the knowledge base the following new context data (in particular an item of context data indicating "Item of information not known"):

Wording: APN
Field: mobile network
Nature: Technology
Type: acronym
Context of appearance:
Context identifier: C4
Definition proposed by the system
Date of appearance: XXXX . . . .
Item of information not known (since definition read by the employee).

If the user does not click on the definition (that is to say does not access the element for understanding), the system extrapolates and considers that the user knows this item of information. It adds (E11) into the knowledge base the following new context data (in particular an item of context data indicating "Item of information known"):

Wording: APN
Field: mobile network
Nature: Technology
Type: acronym
Context of appearance:
Context identifier: C4'
Definition proposed by the system
Date of appearance: XXXX . . . .
Item of information known (since definition not read by the employee).

C) If the user themself searches for the definition of the item of information (acronym "APN") (E1), the system detects it (E2). If the item of information is not present (step E3) in the knowledge base, the system thus stores (E7) the following data in the knowledge base:

Wording: APN
Field: mobile network
Nature: Technology
Type: acronym
Context of appearance:
Context identifier: C5
Search for the element
Via a search tool
1 sentence long
Date of appearance: XXXX
Item of information not known The system displays (E8) a proposition to access the definition of this acronym (item of information) to the user. See paragraph A above for the rest (according to whether the user clicks on the definition or not, passage to step EH) or E11).

Production of the Machine Learning Model (Via the AI Algorithms) to Compute the Knowledge Index of an Item of Information The knowledge base will thus be filled with information and data specific to the user and allow the production of a model capable of assigning a knowledge index to each of the items of information.

The data of the knowledge base is analysed and allows the production of entry data, for a conventional process of building (formation) of the machine learning model.

Each item of entry data is accompanied by the associated known result (knowledge index is equal to "1" if the item of information is known or to "0" if the item of information is not known).

The building algorithm then identifies trends in these entry data and results, which will match the attributes of the entry data with the result (target, that is to say the value of the knowledge index to be predicted). And it provides at the output a machine learning model that captures these trends.

The attributes (characteristics) to take into account to produce an item of entry data of the machine learning model are for example (non-exhaustive list):

Wording
Field
Nature
Type
Last appearance (encounter)
Number of appearances in reading in the month preceding the last appearance
Number of appearances in writing in the month preceding the last appearance
Average number of sentences of the context of appearance in reading (that is to say of the content read in which the item of information appeared)
Average number of sentences of the context of appearance in writing (that is of the written content in which the item of information appeared)
Reading number of the definition in the month preceding the last appearance
etc.

The associated result (response) is: knowledge index=1 (item of information known) or 0 (item of information not known).

EXAMPLE

Wording: APN
Field: mobile network
Nature: Technology
Type: acronym
Last appearance: [0; 1 month]

Number of appearances in reading in the month preceding the last appearance: <to be computed upon analysis of the knowledge base>

Number of appearances in writing in the month preceding the last appearance: <to be computed upon analysis of the knowledge base>

Average number of sentences of the context of appearance in reading: <to be computed upon analysis of the knowledge base>

Average number of sentences of the context of appearance in writing: <to be computed upon analysis of the knowledge base>

Reading number of the definition in the month preceding the last appearance: <to be computed upon analysis of the knowledge base> etc.

The associated result (response) is: knowledge index=1 (item of information known).

The knowledge index is in the method the result, that is to say the qualitative variable to be predicted by learning.

Each item of entry data produced upon analysis of the knowledge base is for example vectorised. Each value of one of the attributes (characteristics) of an item of entry data is turned into an item of digital data to produce a vectorised item of entry data. Then via artificial intelligence (AI) algorithms of the classification type, the model will allow to obtain the knowledge index, a real value varying from 0 (which means that the item of information is not known) to 1 (which means that the item of information is known) for a new vectorised item of entry data allowing to answer the question (with values inputted for the indications A to L): "What is the knowledge index of an item of information with the wording A, from the field B, of nature C, of type D, for which the last appearance (encounter) took place between E and F months, for which the number of appearances in reading took place G times, in writing H times, in a context of appearance of more than I sentences in reading and J sentences in writing, for which the definitions were read K times the month preceding the last appearance . . . ?". The building algorithm selected depends for example ("deep learning", "LSTM neural network" . . . ) on results of tests on the entry data and can change over time.

The invention claimed is:

1. A method, implemented by a computation machine, of assisting learning of a plurality of items of information by a user of a terminal, wherein the method comprises, during an encounter of the user with a given item of information, among the plurality of items of information, during a use of the terminal, the encounter comprising analyzing, via one or more probes, contents comprising text and/or image and/or sound types that the user has received, sent or searched for and extracting the given item of information based on the analyzing:

storing in a knowledge base an item of context data relative to the encounter of the given item of information, with an entry for the given item of information;

determining a knowledge index of the given item of information, specific to the user, according to context data recorded in the knowledge base with the entry for the given item of information; and proposing access to at least one element for understanding the given item of information as a function of the knowledge index determined, wherein the determination of the knowledge index for N first encounters of the user with a given item of information is a function:

of a period of time since a last encounter of the user with the given item of information, the period of time being computed according to the information and context data stored, with the entry for the given item of information, in the knowledge base; and of a forgetting curve, wherein the determination of the knowledge index for encounters of the user with a given item of information following the N first encounters comprises:

generating an item of entry data, comprising a plurality of attributes themselves determined according to the information and context data stored, with the entry for the given item of information, in the knowledge base;

providing the item of entry data to a machine learning model; and implementing the machine learning model to compute the knowledge index, wherein the method comprises a building of the machine learning model, by carrying out a determined number of building iterations, each corresponding to an iteration of the method for assisting learning, and each comprising:

generating the item of entry data, comprising the plurality of attributes themselves determined according to the information and context data stored, with the entry for the given item of information, in the knowledge base;

determining an estimation of the knowledge index, according to the access or the non-access by the user to the at least one element for understanding; and providing to the machine learning model the item of entry data and a known result, defined as the estimation of the knowledge index, wherein the determined number of building iterations comprises the iteration of the method for assisting learning for the N first encounters.

2. The method according to claim 1, wherein in a case of respectively access and non-access, by the user to the at least one element for understanding, the method comprises a storage, with the entry, of at least one item of context data relative to the respective access and the non-access.

3. The method according to claim 1, wherein the encounter of the user with the given item of information is selected from a group consisting of:

presence of the given item of information in an email written or read by the user with the terminal;

presence of the given item of information in a message, instant or not, written or read by the user with the terminal;

presence of the given item of information in a document written or read by the user with the terminal;

presence of the given item of information in a search carried out by the user with the terminal;

presence of the given item of information in a newsfeed, of a social network, read by the user with the terminal;

presence of the given item of information in a content published on a social network by the user with the terminal; and presence of the given item of information in a textual and/or visual and/or sound content, received, transmitted or searched for by the user with the terminal.

4. The method according to claim 1, wherein the at least one element for understanding is selected from a group consisting of:

a definition of the given item of information;

an explanation of the given item of information;

a training on the given item of information;
help relative to the given item of information; and
an element for learning, written and/or oral and/or visual, the given item of information.

5. The method according to claim 1, wherein the at least one item of information data is selected from a group consisting of:
a wording of the given item of information;
a field to which the given item of information belongs;
a nature of the given item of information; and
a type of the given item of information.

6. The method according to claim 1, wherein the context data is selected from a group consisting of:
a type of context indicating a type of the encounter of the user with the given item of information or indicating the proposition to access the at least one element for understanding;
a date of the encounter of the user with the given item of information or of the access or of the non-access to the at least one element for understanding; and
a number of sentences of a content in which the user encountered the given item of information.

7. The method according to claim 1, wherein the attributes comprised in the item of entry data is selected from a group consisting of:
at least one information attribute, inputted with the at least one item of information data; and
at least one context attribute, inputted with the context data and belonging to the group comprising:
a reference date, defined as a most recent date out of one or more date(s) of encounter of the given item of information and one or more date(s) of proposition of access to the at least one element for understanding;
a number of encounters of the given item of information in reading in a predetermined period preceding the reference date;
a number of encounters of the given item of information in writing in the predetermined period;
a number of searches for the given item of information, by the user, in the predetermined period;
an average number of sentences in contents in which the user has encountered the given item of information in reading in the predetermined period;
an average number of sentences in contents in which the user has encountered the given item of information in writing in the predetermined period; and
a number of accesses to the at least one element for understanding, in the predetermined period.

8. The method according to claim 1, wherein the estimation of the knowledge index is equal to:
a first value indicating that the given item of information is not known to the user, in the case of access by the user to the at least one element for understanding; and
a second value indicating that the given item of information is known to the user, in the case of non-access by the user to the at least one element for understanding.

9. The method according to claim 1, wherein the building of the machine learning model is carried out again after a predetermined number of iterations of the method for assisting learning and/or at a predetermined frequency.

10. A processing circuit comprising a processor and a memory, the memory storing program code instructions of a computer program which, when the computer program is executed by the processor, cause the processor to carry out the method according to claim 1.

11. A storage medium readable by a computer and non-transient, storing the computer program according to claim 10.

12. A computation machine configured to carry out the method according to claim 1.

13. A method, implemented by a computation machine, of building of a machine learning model, by carrying out a determined number of building iterations, each corresponding to an iteration of a method for assisting learning of a plurality of items of information by a user of a terminal,
wherein the method for assisting learning comprises,
during an encounter of the user with a given item of information, among the plurality of items of information, during a use of the terminal, the encounter comprising analyzing contents comprising text and/or image and/or sound types that the user has received, sent or searched for and extracting the given item of information based on the analyzing:
storing in a knowledge base an item of context data relative to the encounter of the given item of information, with an entry for the given item of information;
during the determined number of building iterations, determining a knowledge index of the given item of information, specific to the user, according to context data recorded in the knowledge base with the entry for the given item of information; and
proposing access to at least one element for understanding the given item of information as a function of the knowledge index determined;
determining that the user access the provided element; and
storing in the knowledge base, with the entry for the given item of information, at least one other item of context data relative to the access;
wherein a building iteration each further comprises:
determining an estimation of the knowledge index, according to the access or the non-access by the user to the at least one element for understanding for a given item of information; and
providing to the machine learning model the estimation of the knowledge index,
wherein the machine learning model is built to be adapted to determine the knowledge index of the given item of information, specific to the user, according to context data recorded in the knowledge base with the entry for the given item of information, by computing a result forming the knowledge index.

14. The method of building of a machine learning model according to claim 13, wherein, during the determined number of building iterations, the determination of the knowledge index of the given item of information is carried out by using a forgetting curve.

15. The method of building of a machine learning model according to claim 14, wherein, during the determined number of building iterations, the determination of the knowledge index is a function:
of a period of time since a last encounter of the user with the given item of information, the period of time being computed according to the information and context data stored, with the entry for the given item of information, in the knowledge base; and
of a forgetting curve.

* * * * *